Patented Apr. 18, 1939

2,154,979

UNITED STATES PATENT OFFICE 2,154,979

PROCESS FOR THE MANUFACTURE OF A 3-ALKOXY-4-HYDROXY-BENZALDEHYDE

Christo Nikoloff Geneff, Sofia, Bulgaria

No Drawing. Application March 13, 1936, Serial No. 68,778. In Switzerland March 26, 1935

4 Claims. (Cl. 260—600)

This invention concerns a new method for the preparation of 3 - alkoxy - 4 - oxybenzaldehydes which by the use of considerably higher concentrations than in the known art produces an excellent yield by very simple means.

3-methoxy- and 3-ethoxy-hydroxy-benzaldehydes have already been produced by hydrolysis and oxidation of the 3-methoxy-4-hydroxyphenyltrichlormethylcarbinol and the 3-ethoxy-4 - hydroxyphenyltrichlormethylcarbinol. These valuable compounds can also be produced in a simple manner from the carbinols which are easily obtained from chloralhydrate and the monoethers of the 1,2-dihydroxybenzol. The manner of working which hitherto alone has been recommended, and which consists in oxidizing with reducible compounds of heavy metals in an acid medium has however the drawback, that yields of practical value can only be obtained when working with a highly diluted medium. It has also been proposed to carry through the saponification of the 3 - methoxy - 4 - hydroxy - phenyltrichlormethylcarbinol in alcohol. This method permits working in a concentrated medium and does not require the use of oxidation agents, but the organic solvent must be recovered and this increases the costs.

It has now been found, that very good yields in aldehyde can be obtained by hydrolysing and oxidizing the 3-alkoxy-4-hydroxyphenyltrichlormethylcarbinol, preferably in an alkaline medium without using organic solvents. It is not necessary to work with a highly diluted medium, such as is necessary when an acid or neutral medium is used. The reaction is suitably conducted at a raised temperature and in an aqueous medium. One may operate in an open vessel or under pressure. As oxidation agents there may be used, quite generally, those which are active in alkaline medium, for example alkali metal salts of chromic acid. It has also been found, that small proportions of a suitable catalyst or contact substance may have a very favorable effect on the reaction. Examples of such substances are copper or copper compounds which have a particularly active effect.

A considerable advantage of the invention is that the process can be conducted at a higher concentration than has been possible in the known processes.

Example 1

Into an apparatus made from copper and having a stirrer and a reflux condenser there are introduced 200 parts of water, 15 parts of sodium hydroxide and 5.2 parts of sodium bichromate. This mixture is heated to 40° C., and there are added slowly, while stirring well, 15 parts of 3-methoxy - 4 - hydroxy-phenyl-trichlormethylcarbinol. The whole is now heated to boiling and boiling is continued for 14 hours. After cooling, the reaction liquid is freed from the chromium hydroxide separated out by filtering and the filtrate is acidified with dilute sulphuric acid. The free 3-methoxy-4-hydroxybenzaldehyde for the most part crystallizes. By extracting the liquor with a suitable solvent, such as chloroform, further quantities of the aldehyde may be obtained. The crude product thus obtained is by a simple distillation converted into pure 3-methoxy - 4 - hydroxybenzaldehyde. The yield amounts at least to 80% of the theoretical yield, calculated to the amount of 3-methoxy-4-hydoxy-phenyl-trichlormethylcarbinol. The procedure may be the same when the corresponding ethyl-derivative or a still higher homologue of the 3 - methoxy - 4 - hydroxy-phenyl-trichlormethylcarbinol is the parent material. During the oxidation copper as powder may be added to the mass undergoing reaction, to act as a catalyst. Without risking any decrease of the yield also a lye of much higher concentration may be used. In the described example for instance only 55 parts of water may be used for 15 parts of sodium hydroxide.

By suitable lengthening of the reaction the same effect may be achieved also at a lower temperature, for instance 93 to 98° C.

The same yield of aldehyde is also obtained when the above named quantity of sodium bichromate is replaced by 10 parts of manganese peroxide of 66% or 13.3 parts of lead peroxide of 100%. In the last named case the trichlorine compound should first be saponified in hot state and thereupon be oxidized for some time at about 70° C.

When the two last named oxidation agents are used, the pressure of a catalyst is not absolutely necessary.

Of other oxidation agents, which also are active in alkaline medium (barium peroxide, dioxide of hydrogen, sodium perborate, sodium persulfate and the like), after preceding saponification and in the presence of copper, particularly barium peroxide, dioxide of hydrogen and potassium permanganate have been found to be advantageous.

Example 2

The parent mixture used in Example 1 is heated to 150° C. in a closed copper vessel for 2 hours. The mass is then worked up as described in Example 1. Also here there is obtained yields up to more than 80% of the theoretical yield of the pure 3-methoxy- or 3-ethoxy-4-hydroxybenzaldehydes, according to the 3-alkoxy-4-hydroxy-phenyltrichlormethylcarbinol used in the parent mixture.

Also in this case, as in Example 1, good results are also obtained when the sodium bichromate is replaced by other oxidation agents, for instance manganese peroxide.

I claim:

1. A process for the manufacture of a 3-alkoxy-4-hydroxy-benzaldehyde, which comprises heating 3 - alkoxy - 4 - hydroxy-phenyltrichlormethyl carbinol in an aqueous medium containing an alkali metal hydroxide and an alkali metal chromate in contact with copper as a catalyst.

2. A process for the manufacture of a 3-alkoxy-4-hydroxy-benzaldehyde which comprises heating 3 - alkoxy - 4 - hydroxy-phenyltrichlormethyl carbinol in an aqueous medium containing an alkali metal hydroxide and an oxidizing agent in contact with copper as a catalyst.

3. A process for the manufacture of a 3-alkoxy-4-hydroxy-benzaldehyde which comprises heating 3 - alkoxy - 4 - hydroxy-phenyltrichlormethyl carbinol in an aqueous solution of an alkali metal chromate until it saponifies, then adding lead peroxide to the mixture and continuing the heating in contact with copper as a catalyst until the reaction is complete.

4. A process for the manufacture of a 3-alkoxy-4-hydroxy-benzaldehyde, which comprises heating 3 - alkoxy - 4 - hydroxy-phenyltrichlormethyl carbinol in an aqueous medium containing an alkali metal hydroxide and sodium chromate in contact with copper as a catalyst.

CHRISTO NIKOLOFF GENEFF.